Aug. 1, 1939.  A. N. A. ANDERSSON  2,167,822
HEATING RADIATOR
Filed Dec. 28, 1936  4 Sheets-Sheet 1
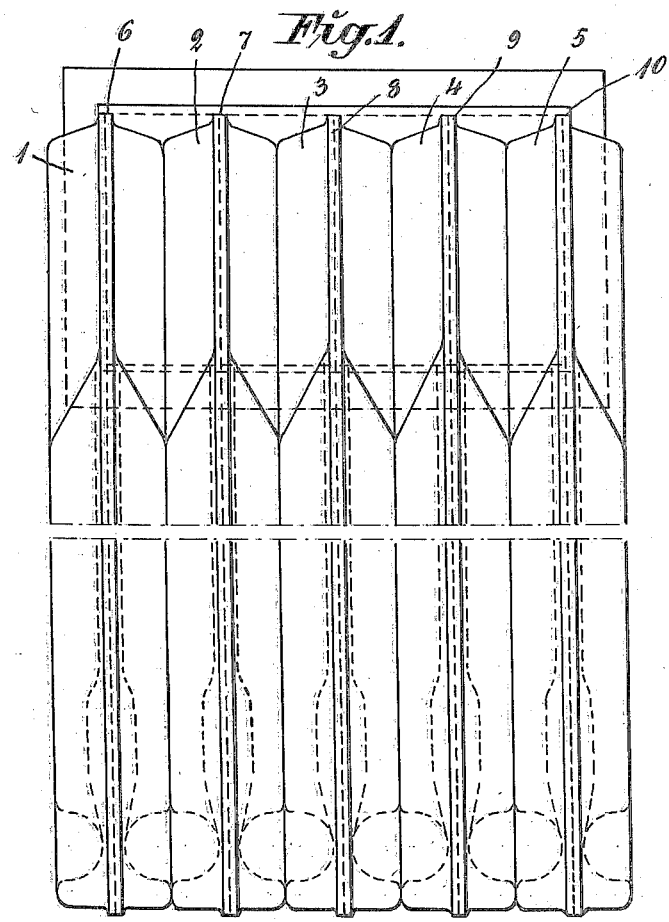
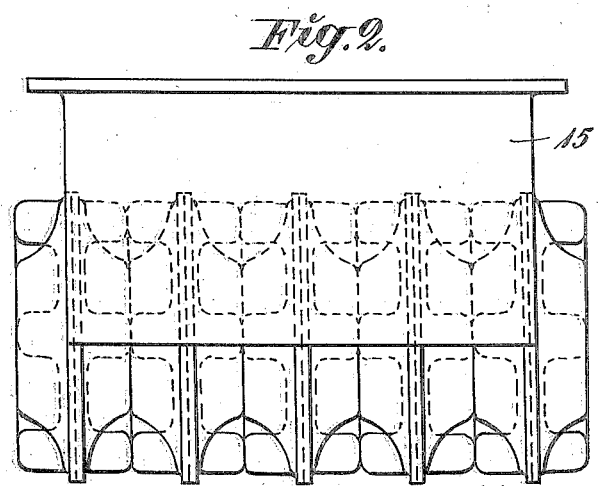
Inventor
Axel Nore Alexander Andersson
By Haseltine, Lake & Co. Attorneys Aug. 1, 1939. A. N. A. ANDERSSON 2,167,822
HEATING RADIATOR
Filed Dec. 28, 1936 4 Sheets-Sheet 2

Inventor
Axel Nore
Alexander Andersson
By Haseltine, Lake & Co.
Attorneys

Aug. 1, 1939.  A. N. A. ANDERSSON  2,167,822
HEATING RADIATOR
Filed Dec. 28, 1936   4 Sheets-Sheet 3
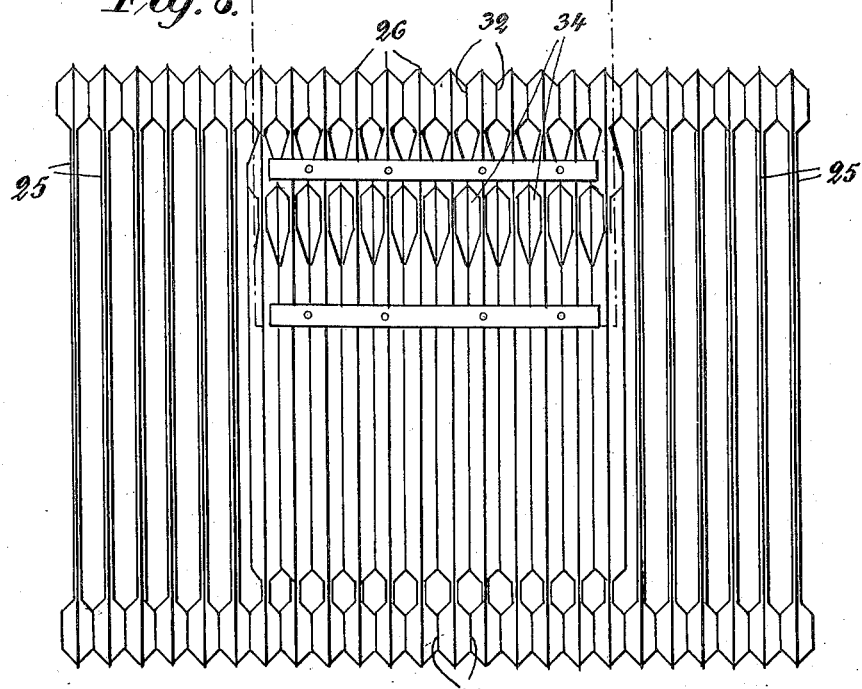
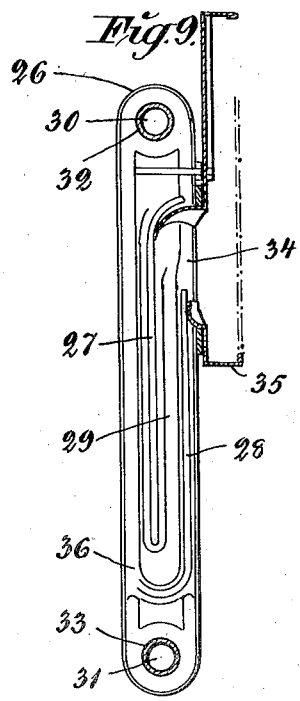
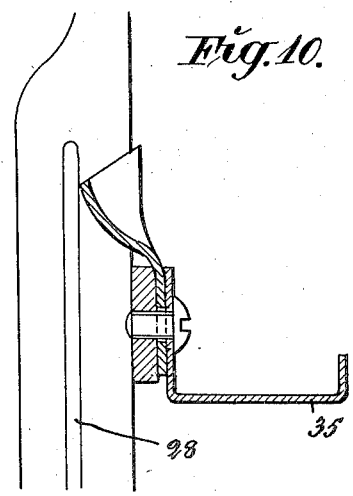
Inventor
Axel Nore Alexander Andersson
By Haseltine, Lake & Co.
Attorneys Aug. 1, 1939.　　　　A. N. A. ANDERSSON　　　　2,167,822

HEATING RADIATOR

Filed Dec. 28, 1936　　　　4 Sheets-Sheet 4

Inventor
Axel Nore Alexander Andersson
By Haseltine, Lake & Co.
Attorneys

Patented Aug. 1, 1939

2,167,822

UNITED STATES PATENT OFFICE 2,167,822

HEATING RADIATOR

Axel Nore Alexander Andersson, Stockholm, Sweden, assignor to Aktiebolaget Svenska Flaktfabriken, Stockholm, Sweden, a company of Sweden Application December 28, 1936, Serial No. 117,747 In Sweden February 9, 1935

5 Claims. (Cl. 257—140)

This invention relates to radiators for heating purposes composed of a plurality of mutually communicating sections enclosing between them air channels extending vertically through the radiator. It is an object of the invention to provide an improved construction of such radiators which is particularly adapted for simultaneously heating the air in the room and fresh air drawn from a fresh air intake through the air channels into the room.

According to the invention each radiator section is formed of two plates which are jointed together at the edges, preferably by welding, and which are provided along their edges with laterally projecting hollow pressed flanges, adjacent sections being connected with each other by individually uniting together the plates around the edges of the openings through which the sections communicate with each other in such a manner, that through said connection the hollow flanges are held abutting against each other so as to form hollow walls separating the air channels from the room.

According to a preferred embodiment of the invention the adjacent sections are individually united together by welding seams extending around the edges of the communication openings.

Other features of the invention will hereinafter appear and will be pointed out in the appended claims.

The invention will now be described more in detail having reference to the drawings annexed to this specification and forming part thereof which show by way of example two different embodiments of my invention.

In the drawings:

Figure 1 is a front view of a heating radiator according to a first embodiment of the invention.

Figure 2 is a plan view of the radiator shown in Figure 1.

Figure 3:
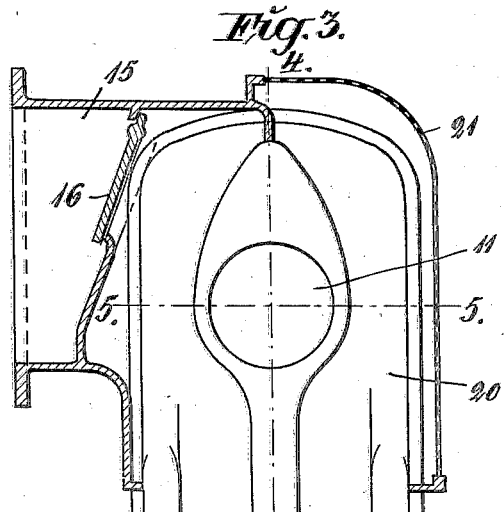
Figure 3 is a sectional view taken in the abutting surface between two adjacent radiator sections.
Figure 4:
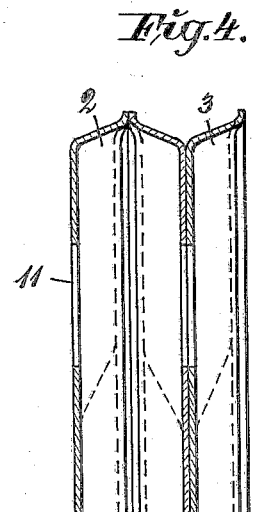
Figure 4 is a vertical section on the line 4—4 in Figure 3.
Figure 5:
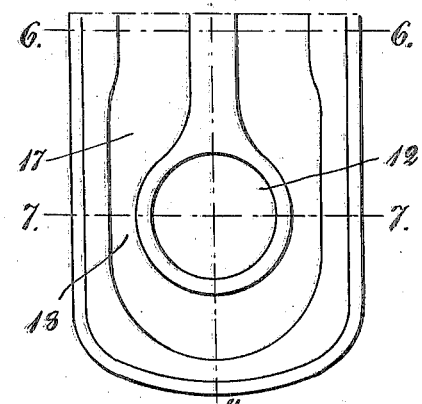
Figure 6:
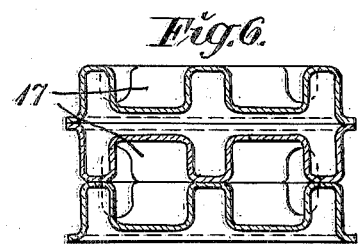
Figure 7:
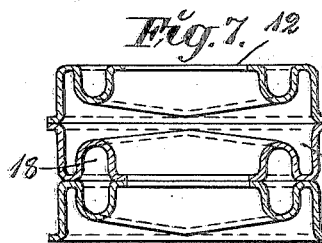

Figures 5, 6 and 7 are horizontal sections on the lines 5—5, 6—6 and 7—7 respectively in Figure 3.

Figure 8 is a rear view of a heating radiator according to a second embodiment of the invention, the duct for connecting the fresh air channels to the fresh air intake being removed.

Figure 9 is a vertical section in the abutting surface between two adjacent radiator sections.

Figure 10 is a detail view showing on a larger scale the air-tight connection between the fresh air duct and the radiator.

Figure 11:
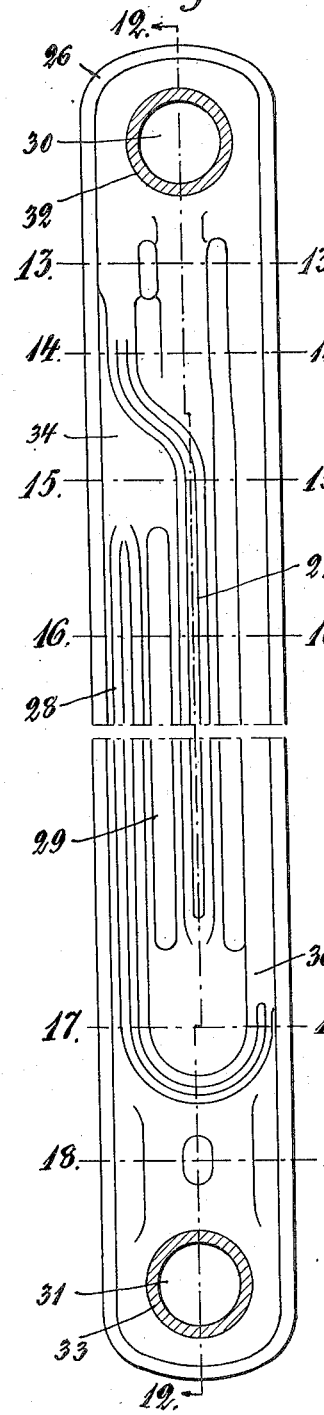

Figure 11 shows on a larger scale the radiator section shown in Figure 9.

Figure 12:
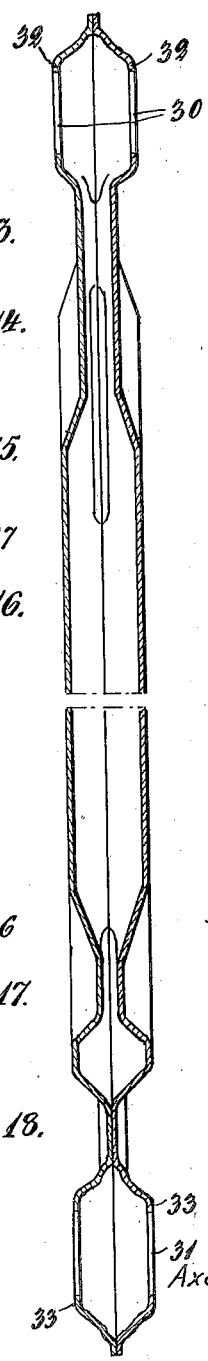
Figure 13:
Figure 14:
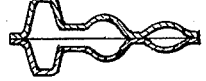
Figure 15:
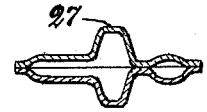
Figure 16:
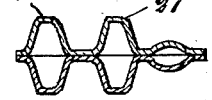
Figure 17:
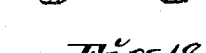
Figure 18:

Figure 12 is a vertical section on the line 12—12 in Figure 11.

Figures 13 to 18 are horizontal sections on the lines 13—13, 14—14 etc. in Figure 11.

The radiator shown in Figures 1 to 7 is composed of a plurality of vertically arranged sections 1 to 5 of pressed metal plate each of which sections is made of two symmetrical halves which are mutually welded together along the edges 6—10 as is most clearly seen in Figures 4—7. At the top and at the bottom the sections are provided with round openings 11 and 12 in the side walls through which openings adjacent sections communicate at the top and at the bottom so that a common water space is formed. Adjacent sections are connected together through welded joints along the edges 13, 14 of the openings 11, 12, which welded joints form seals between the different sections and also form connections through which the sections are held together so as to form a rigid system. The mechanical joining of the sections can, if required, be further strengthened through spot welding at certain points in the abutting side walls. For simplicity of illustration the connections of the radiator to the supply and discharge water pipes are not shown in the drawings.

The upper rear part of the radiator is connected to an air inlet opening in an outer wall by means of an air duct 15. In the latter is provided a shutter 16 adjustable from the interior of the room, which shutter is disposed in the upper part of the air duct for the purpose of preventing particles which happen to drop into the air duct from entering the air channels of the radiator. In direct connection with the air duct 15 there are provided according to the invention air channels 17 in the radiator between the various sections thereof. In the embodiment shown these channels are U-shaped. The channels extend substantially vertically along the back and front sides of the radiator, the air which enters through the air intake first passing downwards through the back part of the radiator thereafter round the edges of the lower opening 12 and then upwards through the front part of the radiator and out into the room.

The air channels 17 are formed by groove-shaped depressions pressed in the side walls of the sections. The plates of which the radiator sections are composed are preferably pressed so that the opposite halves of adjacent sections become symmetrical with respect to a plane through the abutting surfaces of the sections, each channel being formed of two opposite depressions in the side walls. Provided that the plates are carefully pressed and carefully connected together at the welded joints 6—10 and 13, 14 the plane parts of the side walls of the sections will come to lie closely together so that no special sealing is required. In some cases, however, it may be desirable to apply a sealing mass between the abutting surfaces. The groove-shaped depressions make the side walls sufficiently rigid to permit the portions of the side walls abutting against each other to be pressed accurately plane.

In order to secure under all conditions a perfect seal between the opposite side surfaces of the radiator sections, the middle portions of the side walls, particularly around the openings 11, 12, can simultaneously with the pressing of the groove-shaped impressions or through a separate pressing operation be given a slightly bent-in shape. When the side walls are thereafter welded together at the edges of the openings 11, 12 while the side walls of the plates are kept pressed closely together under elastic deformation of the plates, the spring tension remaining in the side walls after welding is completed will maintain adjacent sections pressed against each other with great force, whereby a sealing contact between the side walls is ensured and the radiator in its entirety obtains increased stiffness.

The inlet and outlet openings of the channels are formed by the radiator sections at their upper part being given a cross sectional shape which narrows in the direction outwards as shown in Figure 5. Said sectional shape changes continuously downwards into the sectional shape shown in Figure 6.

The inlet openings are completely covered by the air duct 15 placed over the upper rear half of the radiator, the air duct being preferably secured to the radiator by welding. Through the outlet openings 20 positioned in the upper front portion of the radiator the air channels are in open connection with the air in the room in which the radiator is installed. The openings 20 are preferably covered with a removable grille 21 serving to damp and distribute the air current and also to prevent foreign objects from being thrown into the channels 17.

The channels 17 are contracted at the level of the openings 12, as shown at 18 in Figure 3. These contractions have for their object to cause the air which has previously been near the walls of the channel to mix with the air which flows at the centre of the channel and therefore is colder. For the same purpose the air channels are made shallower at said points as shown at 19 in Figures 4 and 7.

In some cases it may be preferable to dispose the channels 17 entirely above the openings 12, the latter openings being then located as close to the bottom of the radiator sections as possible in order to leave room for the parts of the channels which at the bottom connect the vertical channel portions together.

In the embodiment of the invention just described the fresh air channels are obviously so located that the side flanges forming said channels render the welding together of the individual sections to a composite radiator rather difficult, in that the welding must be effected from the inside of the radiator. This can be readily done, when it is a question of adding one section at a time. The construction described does not, however, permit of welding together two or more radiator parts each consisting of a plurality of sections. Yet this is sometimes desirable, for instance to be able rapidly to effect an order for a radiator which is not of standard size by welding together two or more of the standard sized radiators kept in stock. Figures 8 to 18 illustrate an embodiment of the invention in which the fresh air channels are positioned entirely above respectively below the joints along which the adjacent sections are welded together resulting in that said joints become readily accessible for welding from without.

In the radiator shown in Figure 8 the sections 25 positioned nearest to the ends are of ordinary shape so that the air in the room has free access between the sections. The middle sections 26, on the other hand, are formed with pressed side flanges 27 and 28 which in adjacent sections abut against each other so that between the sections closed channels 29 are formed which in the embodiment illustrated are substantially J-shaped and open at opposite sides of the radiator. The flanges 27 and 28 are positioned between the side openings 30, 31 through which the radiator sections communicate with each other, as is most clearly seen in Figure 11, wherefore the circular welded joints 32 and 33 become readily accessible from without. The upper mouths 34 of the channels 29 communicate over a space enclosed by a duct 35 with a fresh air intake, not shown. The lower channel ends 36, which are positioned at the front side of the radiator, open directly into the room. The radiator is particularly intended to be installed in a room which is artificially ventilated through evacuation. On account of the reduction in pressure caused in the room on account of the sucking out of the air, fresh air is drawn in through the channels 29, the sucked-in air being heated by the radiator during its passage through the radiator channels.

I claim:

1. A radiator unit for simultaneously heating the air in the locality in which the radiator is situated and ventilating air introduced into said locality, comprising a plurality of mutually intercommunicating hollow vertical radiator sections formed with hollow side flanges which are in direct communication with the interior of the respective sections and adapted to abut tightly against similar side flanges on the adjacent sections so as to form between the sections closed channels each comprising a rear and a front vertical branch, a ventilating air intake duct communicating at the rear of said unit with the rear vertical branch of each section at its upper end and at its lower end communicating with the front vertical branch, and the upper end of said front vertical branch opening directly into the locality to be heated by the radiator.

2. A radiator unit according to claim 1, in which the closed channels between the sections are extended downwardly at the rear of and thence upwardly at the front of the sections to form substantially U-shaped passage-ways for effectively prolonging the contact of the ventilating air with the heat radiating portions of the unit.

3. A radiator unit according to claim 1, in which the closed channels between the sections are extended downwardly at the rear of and thence upwardly at the front of the sections to form substantially J-shaped passageways for effectively prolonging the contact of the ventilating air with the heat radiating portions of the unit, the longer branches of the channels being connected to the ventilating air intake.

4. A radiator unit according to claim 1, in which the passage-ways for the ventilating air end in the front and rear portions of the radiator.

5. A radiator unit according to claim 1, in which the air channels extend entirely above the lower communication openings for the heating medium.

AXEL NORE ALEXANDER ANDERSSON.